US 6,570,756 B2

(12) United States Patent
Alfonso et al.

(10) Patent No.: US 6,570,756 B2
(45) Date of Patent: May 27, 2003

(54) PERSONAL COMPUTER SYSTEM HOUSING AND SECURITY SYSTEM

(75) Inventors: Pedro Marcos Alfonso, Austin, TX (US); Crispian Grant Tompkin, Austin, TX (US); Christian Okonsky Gerard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 09/974,200

(22) Filed: Oct. 10, 2001

(65) Prior Publication Data

US 2003/0067741 A1 Apr. 10, 2003

(51) Int. Cl.⁷ .................................................. H05F 5/00
(52) U.S. Cl. ...................... 361/683; 361/681; 361/724; 312/223.1; 312/223.2
(58) Field of Search ................................ 361/681, 683, 361/679, 686, 724–727; 312/223.1, 223.2, 350, 316.7, 400; D14/100, 114, 439–447; D24/329

(56) References Cited

U.S. PATENT DOCUMENTS

| | | | |
|---|---|---|---|
| 4,786,121 A | * 11/1988 | Lyons | 312/350 |
| 4,949,934 A | * 8/1990 | Krenz et al. | 361/687 |
| 5,369,549 A | * 11/1994 | Kopp et al. | 361/679 |
| 5,586,002 A | 12/1996 | Notarianni | 361/681 |
| 5,764,480 A | 6/1998 | Crump et al. | 361/685 |
| 5,868,014 A | 2/1999 | Lee | 70/58 |
| 6,006,557 A | 12/1999 | Carl et al. | 70/58 |
| 6,166,910 A | * 12/2000 | Ronberg et al. | 361/724 |
| 6,219,252 B1 | * 4/2001 | Tsai | 361/752 |
| 6,462,953 B2 | * 10/2002 | Tong et al. | 361/732 |

* cited by examiner

*Primary Examiner*—Gerald Tolin
*Assistant Examiner*—Anthony Q. Edwards
(74) *Attorney, Agent, or Firm*—Baker Botts L.L.P.

(57) ABSTRACT

A computer assembly is disclosed having a computer system having at least a central processing unit and memory located within a chassis, and a housing, wherein the computer system is located within and coupled to the housing. The housing has first and second portions positioned substantially adjacent to one another and configured so as to define therebetween at least first and second substantially identical ports in at least first and second sides of the housing respectively. The assembly further includes a mounting member for mounting the computer assembly to a supporting structure, with the mounting member being capable of being removably coupled to the chassis through either of the first and second ports. The computer assembly may also include a locking assembly having a locked state in which the first and second housing portions cannot be separated from one another, and an unlocked state in which the first and second housing portions can be separated from one another.

50 Claims, 10 Drawing Sheets

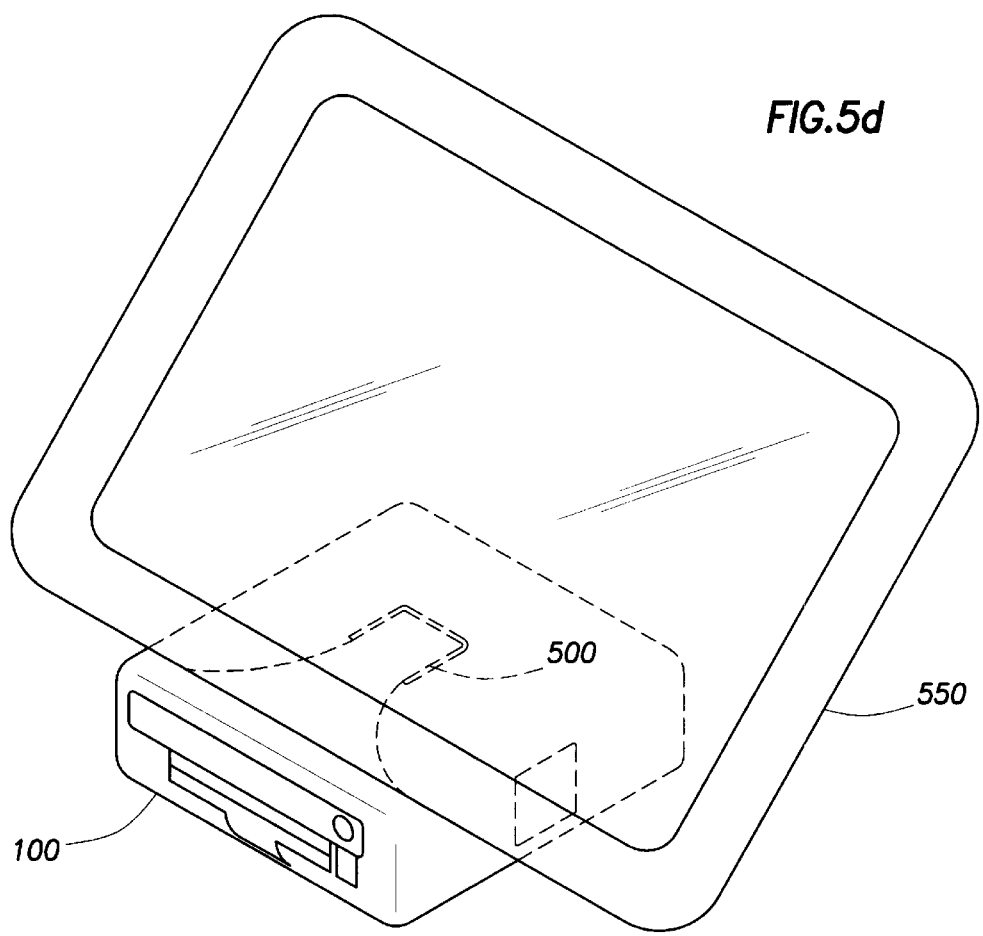
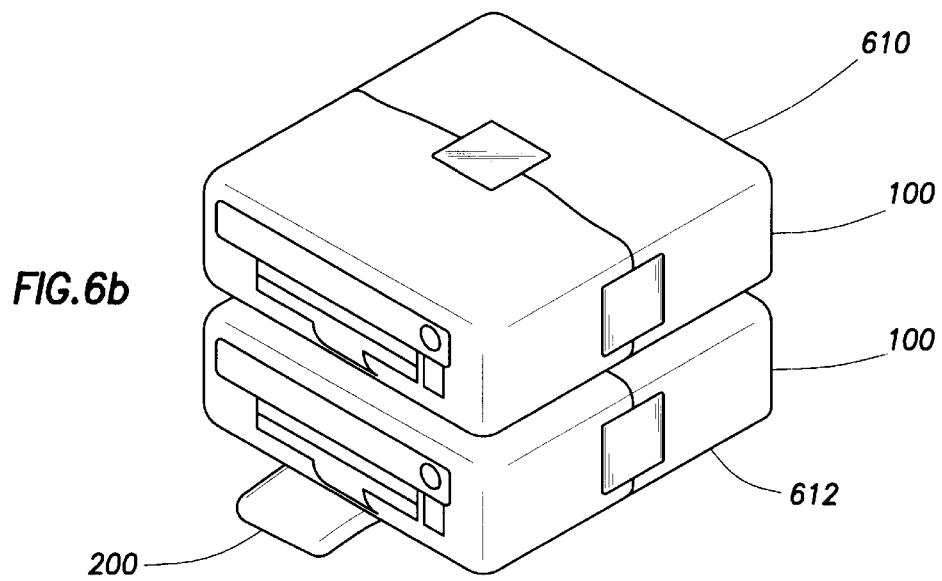

PERSONAL COMPUTER SYSTEM HOUSING AND SECURITY SYSTEM

TECHNICAL FIELD

This invention relates in general to the field of computers, and more particularly, to a computer assembly system and method that can readily be integrated into any working environment in a secure manner.

BACKGROUND

The use of computer systems in both the office place and at home continues to increase. At present, these systems typically reside either on a desktop, or on the floor in close proximity to a desk. Increasingly, however, particularly as working environments become more condensed, users are demanding alternative ways in which to integrate their computer systems into their working environment. Known computer systems do not provides users with such options, as their designs typically do not take into account these user needs.

In addition to growing workplace space constraints, security of computer systems has become increasingly important. Many users are in need of a simple and efficient way to physically secure their computer systems to prevent theft of the systems themselves, and of the information stored on those systems. For desktop computers, Kensington® brand locks and cables that essentially tether the computer system to a desk or work surface are a popular security mechanism. The cables, however, can be cut, and further, these cables do not prevent unauthorized access to the computer itself, or its peripheral devices.

SUMMARY

Therefore, a need has arisen for industry for a computer assembly that enables a computer system to be readily integrated into the workplace in alternative ways, and for an improved means of security for such a computer system.

In accordance with the present disclosure, a computer assembly is provided having a computer system having at least a central processing unit and memory located within a chassis. The computer assembly further includes a housing, with the computer system being located within and coupled to the housing. The housing has first and second portions positioned substantially adjacent to one another, and configured so as to define therebetween at least first and second substantially identical ports in at least first and second sides of the housing respectively. Also included is a mounting member for mounting the computer assembly to a supporting structure, with the mounting member being capable of being removably coupled to the chassis through either of the first and second ports.

According to one embodiment, the computer assembly further includes a locking assembly having an unlocked state in which the second housing portion can be separated from the first housing portion, and a locked state in which the second housing portion cannot be separated from the first housing portion.

A computer housing assembly is also provided including a housing portion having a first housing portion and a second housing portion positioned substantially adjacent to one another so as to define therebetween at least first and second ports in first and second sides of the housing respectively, wherein the housing is capable of substantially surrounding a computer chassis. The computer housing assembly also includes a mounting member coupled to the computer housing assembly through a selected one of the first and second ports, the mounting member being capable of being coupled to the computer housing assembly through either of the first and second ports.

According to one embodiment, the computer housing assembly further includes a locking assembly having an unlocked state in which the first and second housing portions can be separated from one another, and a locked state in which the first and second housing portions cannot be separated from one another.

Also provided is a method for housing a computer system including the steps of mounting a mounting member to a support surface, coupling a chassis of the computer system to a first housing portion of a computer housing so that the computer system is partially positioned within the first housing portion, and coupling the mounting member to the chassis. The method further includes the steps of positioning a second housing portion adjacent to the first housing portion so that the first and second housing portions substantially surround the chassis, so that the first and second housing portions define therebetween at least first and second substantially identical ports in first and second sides of the computer housing respectively, and so that the mounting member extends through a selected one of the first and second ports, and coupling the second housing member to the chassis.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 5d illustrates yet another embodiment of a mounting member;

FIG. 6b illustrates another embodiment having multiple computer assemblies coupled to one another;

DETAILED DESCRIPTION

Preferred embodiments of the present invention are illustrated in the Figures, like numeral being used to refer to like and corresponding parts of the various drawings.

Figure 1:
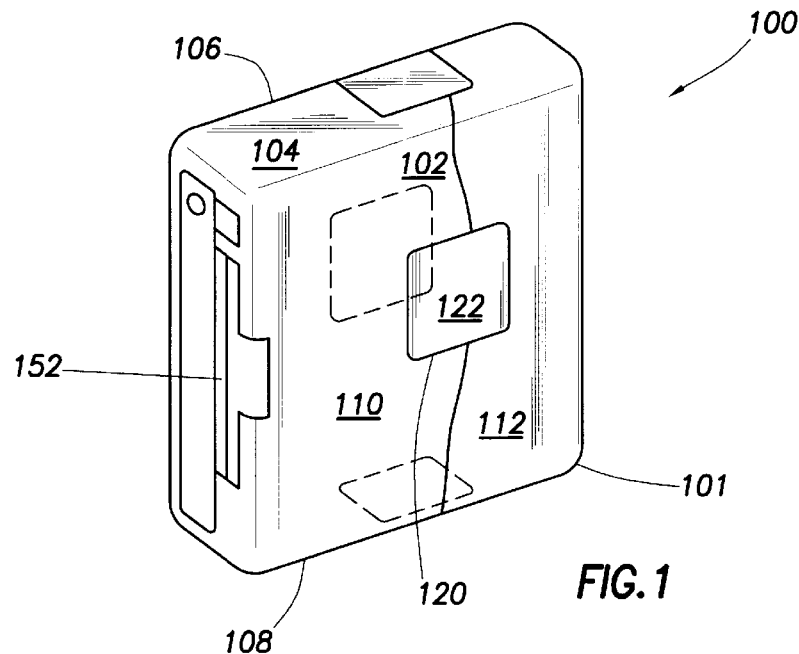
FIG. 1 is a perspective front view illustrating one embodiment of a housing of a computer assembly according to the present disclosure.

FIG. 1 illustrates one embodiment of a computer assembly 100 according to the present disclosure having a computer housing 101 having a first side 102, a second side 104, a third side 106 and a fourth side 108. The computer housing includes a first housing portion 110 and a second housing portion 112 that can be coupled to or positioned adjacent to the first housing portion in the manner shown by FIGS. 1 and 2a. Each of the first and second housing portions have a peripheral edge 114, 116 that, when the first and second housing portion are positioned adjacent to one another, form openings or ports 120 in the computer housing (see also FIG. 7). The housing includes at least first and second ports on any two different sides of the housing respectively, but may also have three or four ports on different sides as shown in FIG. 1. Each port is substantially the same size and configuration.

Figure 2:
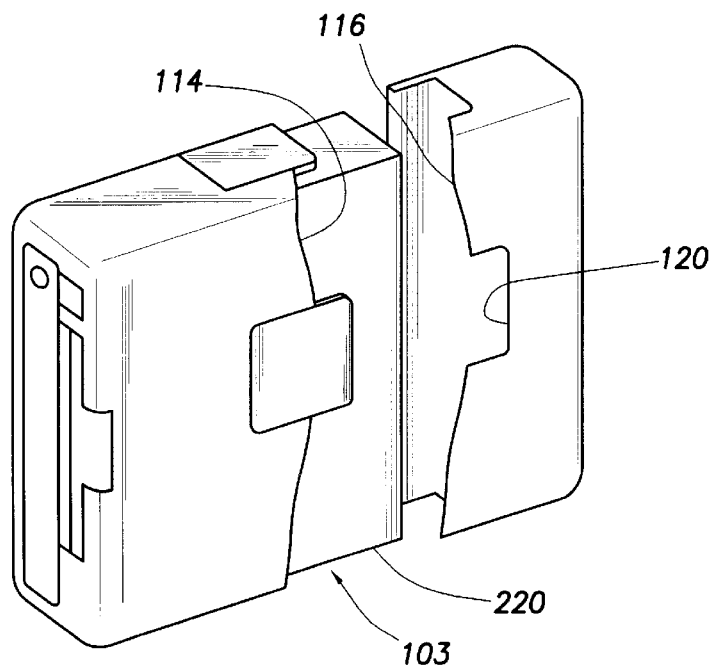
FIG. 2 is a perspective front view illustrating the computer assembly of FIG. 1 when the first and second housing portions are separated from one another.
Figure 3:
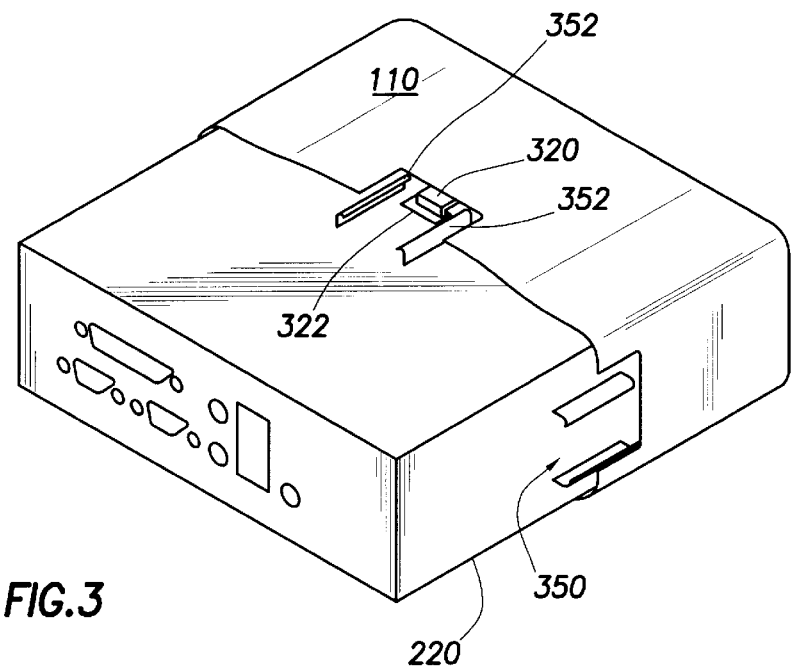
FIG. 3 illustrates a housing portion secured to a computer chassis.

As shown in FIG. 2, positioned within the computer housing 101 is a computer system 103 that includes typical components such as a processor, memory and the like, and any other desired components, that are all positioned within a chassis 220. The chassis fits within and is substantially surrounded by the computer housing when the first and second housing portions are positioned adjacent one another. According to one embodiment, the chassis is physically mounted to the housing. In one embodiment shown in FIG. 3, the first portion of the housing includes a hook element 320 that engages the chassis through an aperture 322 therein, or that otherwise engages a portion of the chassis by any suitable means. The hook element may be fixedly secured to the chassis, or may be engaged in a manner providing easy disengagement and thereby allowing removal of the chassis from within the first housing portion if desired. Any other means, such as screws, snaps or the like, can also be used to secure the first housing portion to the chassis. In another embodiment, the chassis is not fixedly secured to either the first or second housing portion, but merely is of a size and shape so as to fit entirely within the housing when the first and second portions are coupled to one another.

As indicated, each port 120 is of substantially the same size and configuration, and thus, each is capable of receiving a port cover 122 for closing the port. According to one embodiment, the port cover is held in place by an inner flared edge that engages an inner surface of the housing, allowing the port cover to be flush with the exterior of the housing when inserted. The method by which the port cover(s) are inserted in place will be described more fully below.

FIG. 1 illustrates a computer assembly in which port covers are in place to cover all port holes in the housing.

Figure 4A:
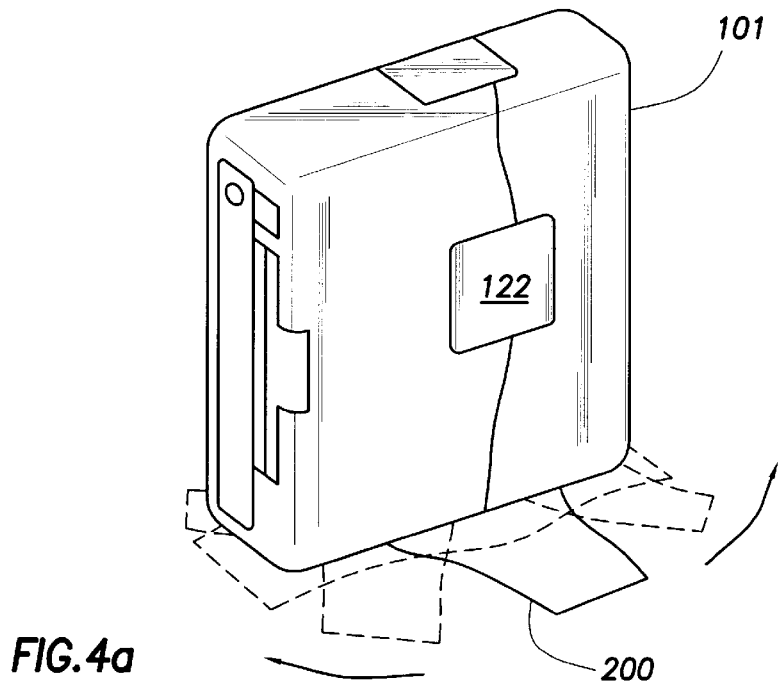
FIG. 4a is a perspective front view illustrating one embodiment of a computer assembly according to the present disclosure including a foot member.
Figure 4B:
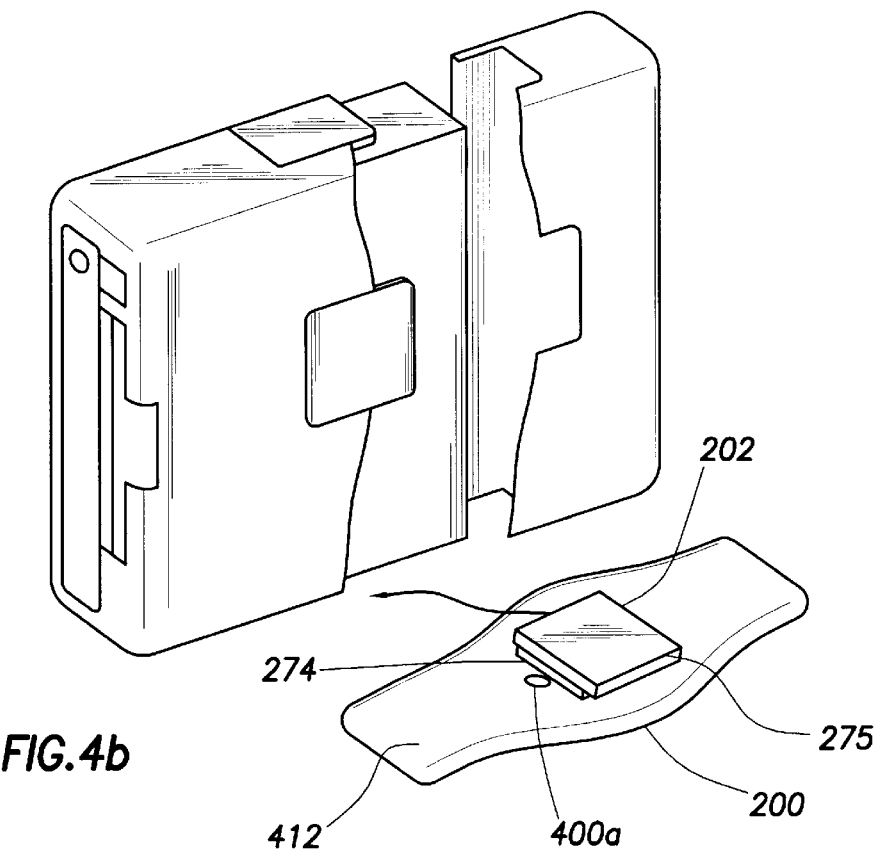
FIG. 4b is a perspective front view of the computer assembly of FIG. 4a with the first and second housing portions and foot member separated from one another.
Figure 4C:
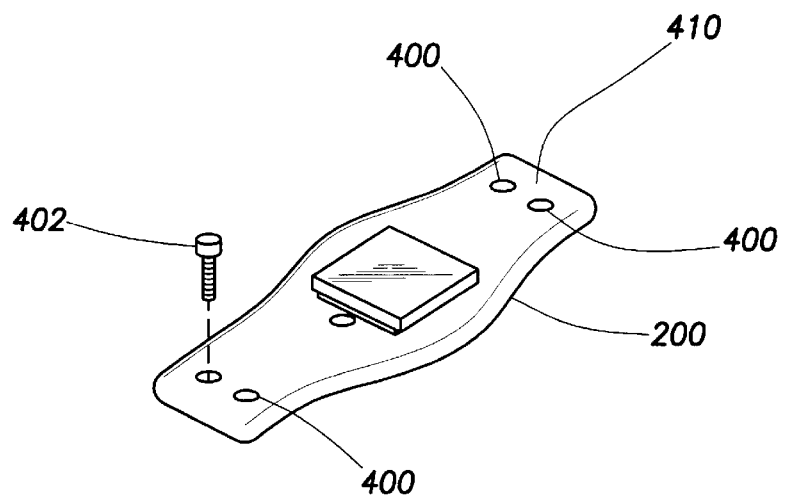
FIG. 4c is a bottom view illustrating one embodiment of a foot member.

Each port, however, is also capable of receiving a plurality of different types of mounting members for positioning and/or mounting the computer assembly within a given work environment. FIGS. 4a–4c illustrate a foot member 200, which is one such mounting member. The foot member 200 preferably includes a coupling portion 202 for coupling the foot member to the chassis. In one embodiment, the coupling portion is received by any selected port, and is configured so as to engage a chassis receiving member 350 (FIG. 3) on the chassis to secure the foot member to the chassis. In one embodiment, the chassis receiving member 350 consists of projections 352 that are substantially hook shaped and facing one another so as to form a groove or channel therebetween. The coupling portion of the mounting member is configured so that it can be slid into the channel and held in place by the projections. As shown in FIG. 4b, the coupling portion has a neck region 274 and an upper flared portion 275. The upper flared portion 275 is of a size such that it engages the projections 352 of the chassis receiving member when slid into the channel between the projections. Any other suitable configuration may also be used for the chassis receiving member and the coupling member to adequately secure the mounting member to the chassis. The chassis includes a substantially identical receiving member corresponding to each port so that a suitable mounting member can be coupled to the chassis through any selected port.

Figure 4D:
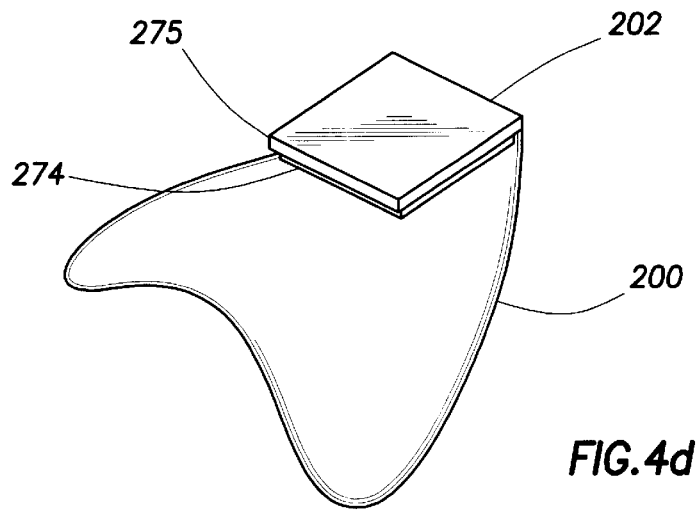
FIG. 4d is a perspective view illustrating another embodiment of a foot member.

The foot member may function as a stand on which the computer system and housing rest as shown in FIG. 4a, or may be mounted to any horizontal, vertical or other surface as will be described more fully below. This foot member may also have any suitable configuration to allow the housing to be positioned perpendicularly relative to the surface to which or on which it is mounted, or at an angle, as shown in FIG. 4d.

Figure 5A:
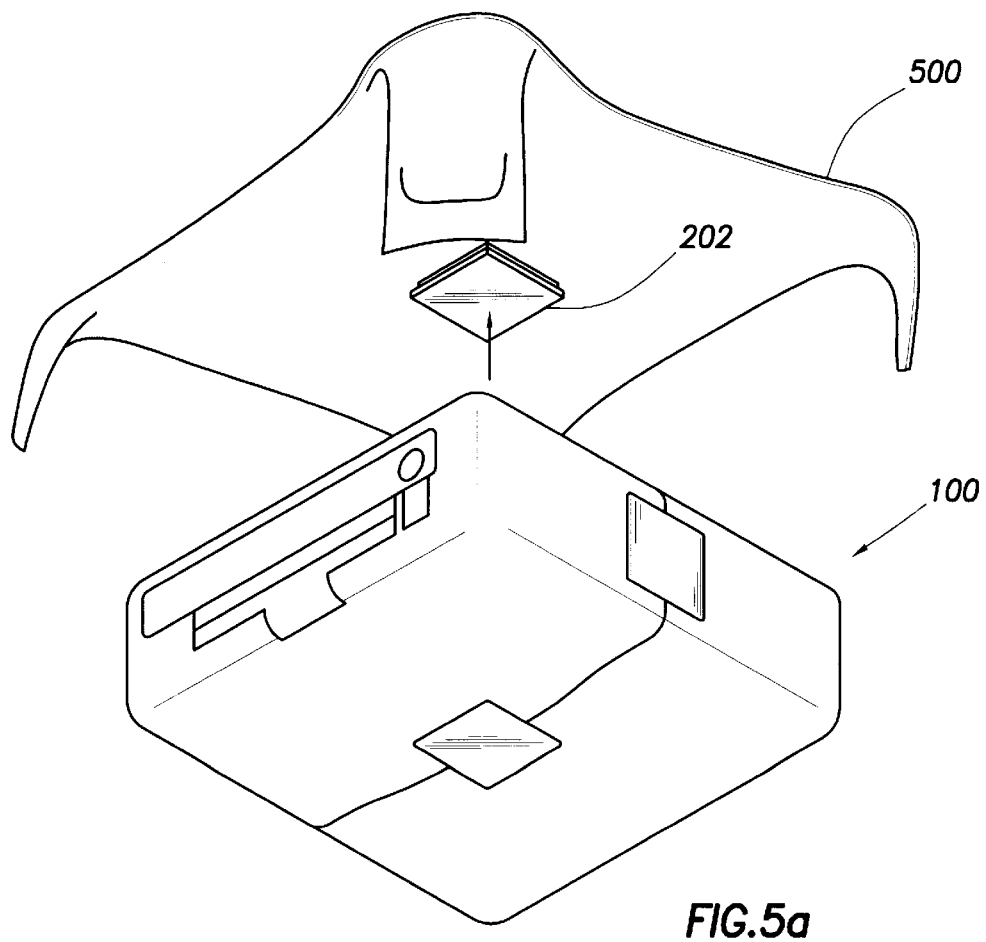
FIG. 5a illustrates another embodiment of a mounting member.
Figure 5B:
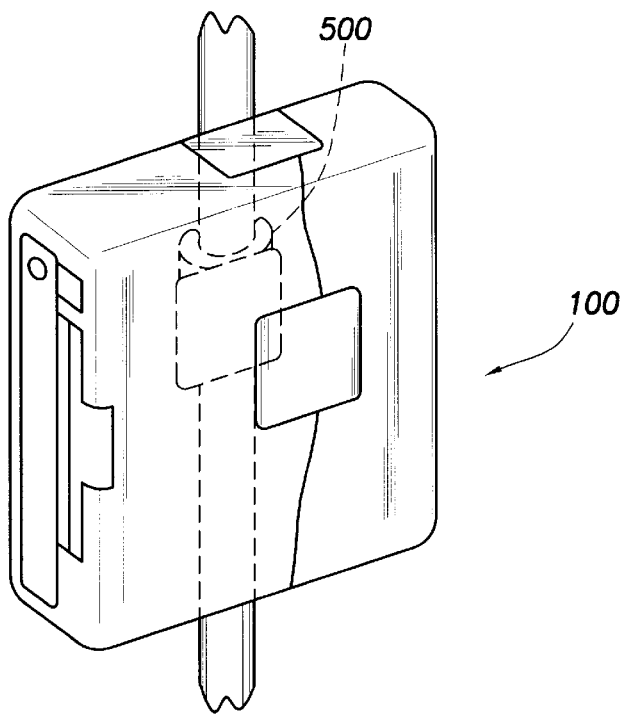
FIG. 5b illustrates yet another embodiment of a mounting member.
Figure 5C:
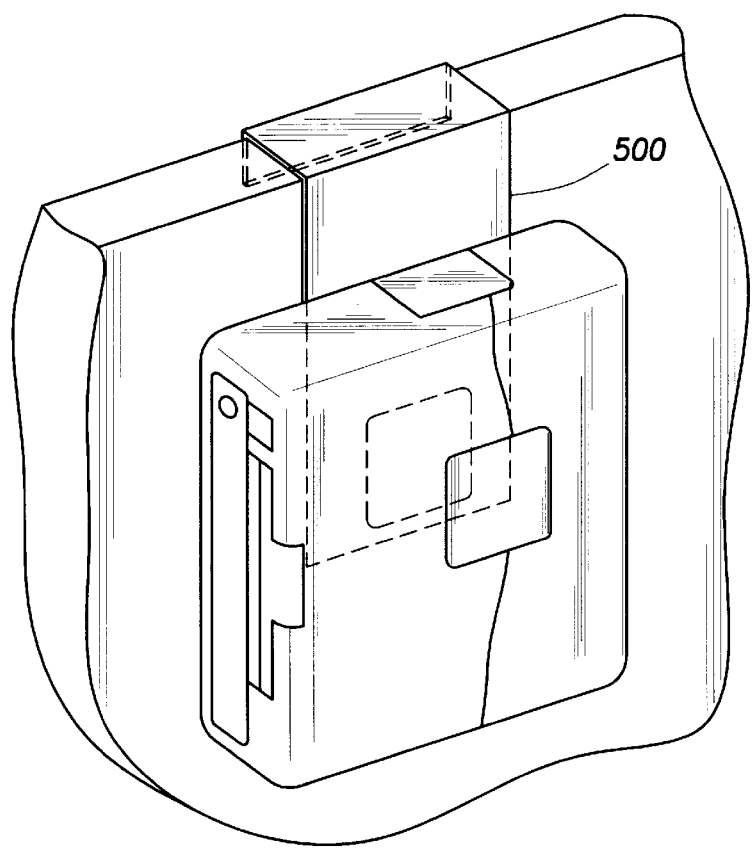
FIG. 5c illustrates yet another embodiment of a mounting member.

Other types of mounting members can also readily be received by the chassis receiving member associated with any selected port to allow for versatility in integrating the computer assembly into the work environment. For example, as shown in FIG. 5a, the mounting member 500 may be a monitor stand (or a stand for any other device), the underside of which includes a coupling portion received through a selected port and coupled to the associated chassis receiving member in a manner similar to that described above. Further, as shown in FIGS. 5b and 5c, the mounting member 500 may be coupled to a column or pole, or a ledge such as the top ledge on dividers in a cubicle. Any mounting member can be envisioned, so long as it can be coupled to the chassis through any selected port. Further, as shown in FIG. 5d, the mounting member may be used to mount other components or devices, such as a flat screen monitor 550, to the computer assembly.

Figure 6A:
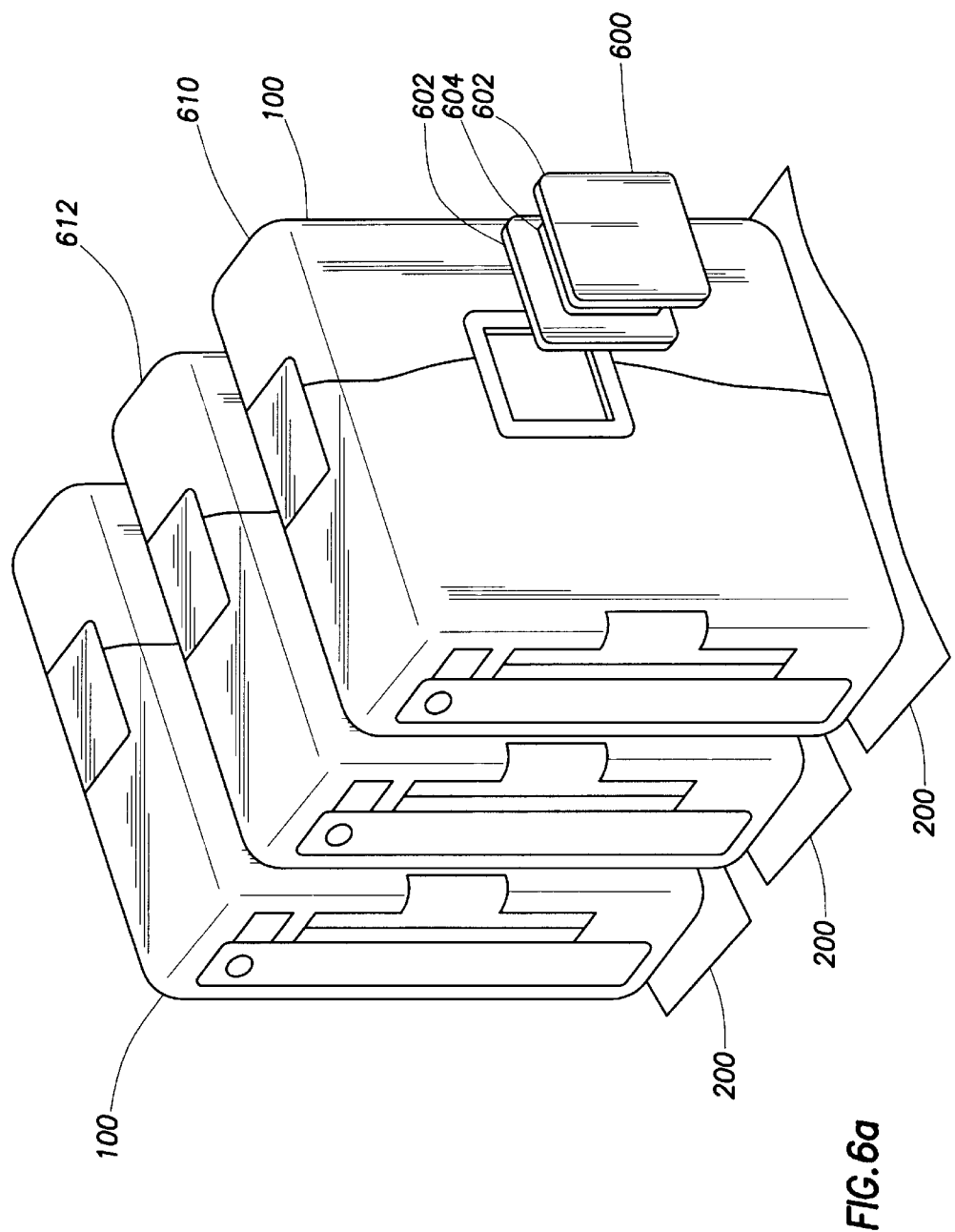
FIG. 6a illustrates one embodiment of a modular mounting member and multiple computer assemblies coupled to one another.

The mounting member may also be a modular connector 600 capable of removably coupling together multiple computer assemblies. As shown in FIGS. 6a and 6b, substantially identical outer flared portions 602 are present on either side of a neck portion 604 so that the modular connector can be coupled to the receiving members of first and second computer assemblies 610, 612. In this manner the first and second computer assemblies can be coupled together closely and securely.

Returning now to the foot member, the foot member also provides a simple and adaptable way for fixedly securing the computer assembly to a designated surface. As shown in FIG. 4a, the foot member can be rotatably coupled to the chassis, allowing the housing to swivel relative to the supporting surface. This advantageously provides versatility in the work place, and also it enables the computer assembly to better absorb the shock of being bumped or knocked by a user. As shown in FIG. 4c, the underside 410 of the foot member includes a plurality of holes or openings 400 for receiving securing elements 402, such as screws or the like, for fixedly securing the foot member to the designated supporting surface. At least one of these securing elements is received by a hole or opening 400a in the upper side 412 of the foot member that is positioned so that after the foot member is mounted to the supporting surface and the chassis and first and second housing portions are in place, it is inaccessible until the first and second housing portions are again separated from one another. In the illustrated embodiment this position is sufficiently close to the coupling member so that the housing, when fully assembled, obstructs access to the securing element in the hole 400a regardless of how the housing is rotated relative to the supporting surface. Thus, once the computer assembly is fixedly secured to a supporting surface via the foot member, it cannot be removed without first separating the first and second housing portions. As the computer assembly according to the present disclosure also includes a locking mechanism for preventing unauthorized separation of the housing portions, as will be described in detail below, the foot member prevents unauthorized access to or removal of the computer within the housing.

The manner in which the housing is assembled and disassembled will now be described in detail with reference to FIG. 7. The foot member 200 or other mounting member is first mounted to the designated support surface 700. Next, the desired port and associated chassis receiving member are selected to receive the mounting member. If the user wishes to position the housing vertically relative to a horizontal surface as shown in FIG. 8a, a port in an end side 800 is chosen. If the user wishes to position the housing vertically relative to a vertical surface or horizontally relative to a horizontal surface as shown in FIGS. 8b and 8c, a port in a side end 802 is chosen.

Figure 9:
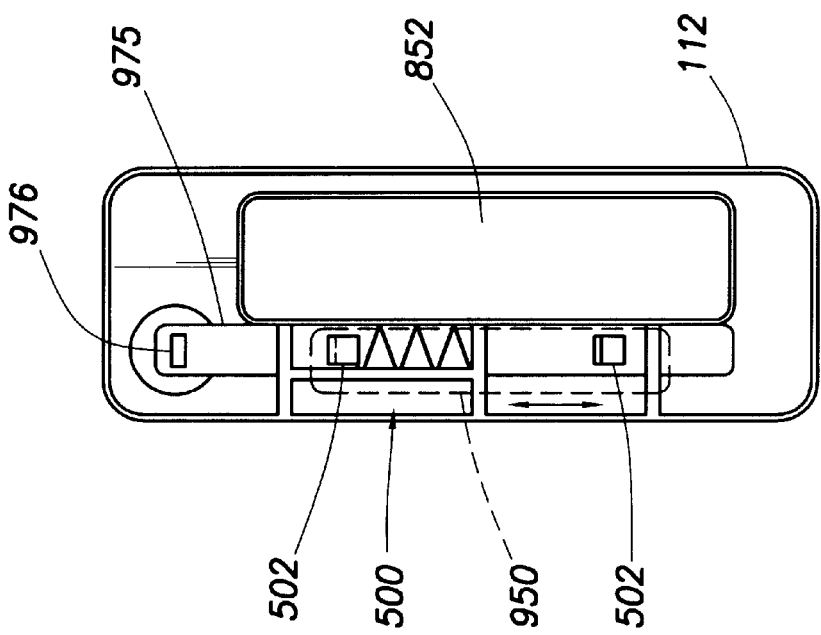
FIG. 9 is an interior rear view of a second housing portion according to the present disclosure.

Once the desired port is selected, the first housing portion 110 and chassis 101 are slid into position relative to the mounting member so that the coupling portion 202 of the mounting member is coupled with the chassis receiving member 350 associated with the selected port. Subsequently, the second housing portion 112 is slid into position in the same manner and preferably also secured to the chassis. According to one embodiment, positioned within the second housing portion is an engaging mechanism 500 including one or more spring loaded tabs 502 or the like as shown in FIG. 9. As the second housing portion is moved into place relative to the first housing portion, the spring loaded tab(s) move over and engage apertures, ridges, and/or projections or the like on the chassis, thereby engaging the chassis. Although in the illustrated embodiment the tab engages the chassis, the tab can also be positioned so as to engage the first housing portion, thereby directly coupling the first and second housing portions together. Prior to positioning the second housing portion, port covers 122 may be placed in position relative to the first housing portion so that they will cover any unused ports upon positioning of the second housing portion.

The spring loaded tab(s) is mechanically linked to a sliding member 950 that is preferably located within a recess 951 in the exterior of the second housing portion. The sliding member is slidable within the recess between a locking position 952 and an unlocking position 954. In the locking position, the spring loaded tab(s) engage the chassis as described above to fixedly secure the second housing portion to the chassis, and relative to the first housing member since the first housing member is also fixedly secured to the chassis. Movement of the sliding member to the unlocking position opposes and overcomes the spring forces that maintain the spring loaded tab(s) in their engaged state, causing the spring loaded tabs to disengage the chassis, thereby enabling the second housing portion to be removed from the chassis and separated from the first housing portion.

In an alternate embodiment in which the tab fixedly secures the second housing portion to the first housing portion, moving the sliding member to the unlocking position causes the locking tab to disengage the second housing portion, allowing separation from one another.

Thus, when the locking tab is engaged as described above, the first and second housing portions are fixedly secured to the chassis, and the computer inside cannot be accessed.

In one embodiment, the computer assembly includes an additional locking mechanism to prevent unauthorized individuals from moving the sliding member from the locking position to the unlocking position. The sliding member 950 is coupled to a bar member, rod or the like 975 that is positioned inside the second housing member. The bar member has an aperture therein 976 that is substantially aligned with a lock aperture 977 in the housing when the sliding member is in the locking position. A lock 980 having a substantially T-shaped projection, such as of the well-known Kensington lock type, can be inserted through both the lock aperture and the bar member aperture. It may also be inserted through a corresponding chassis aperture 978 (FIG. 7). Locking the lock with the appropriate key causes the T-shaped projection to rotate approximately 180 degrees relative to lock so that it can no longer be removed from these apertures. With the lock in place, the T-shaped projection mechanically interferes with movement of the bar member, thereby preventing the sliding member from moving back to the unlocking position.

As the chassis is substantially surrounded by the housing, and is inaccessible without first removing the first and/or second housing portions, the locking mechanism described above prevents unauthorized access to the chassis. Further, because the housing can be secured to a support surface in a manner that does not allow removal without first removing the first and/or second housing members from the mounting member, the computer assembly according to the present disclosure is secured against unauthorized removal of the chassis from work environment, without the need for cables or other tethering devices.

In a computer assembly according to the present disclosure, the chassis may also include a media bay for receiving a hard drive, a compact disc drive, DVD player, or other peripheral device, and the housing further includes a media bay aperture 152 (FIG. 1) therein positioned substantially adjacent to the media bay when the chassis is positioned within the computer housing. The chassis further includes an ejection button or device that, when depressed, activates an internal mechanism such as those well known in the art that ejects the device from the media bay. This ejection button may or may not be accessible through the housing. It further includes an ejection lock device of the well known type that, when activated, interferes with the ejection mechanism to prevent ejection of the device from the media bay. The locking mechanism described above, because it prevents unauthorized access to the chassis, also prevents an unauthorized individual from ejecting any existing device from the media bay. A user may simply activate the ejection lock, and once the computer systems is secured within the housing it cannot be accessed without separation of the housing, which itself cannot be done without the key to the lock.

Figure 7:
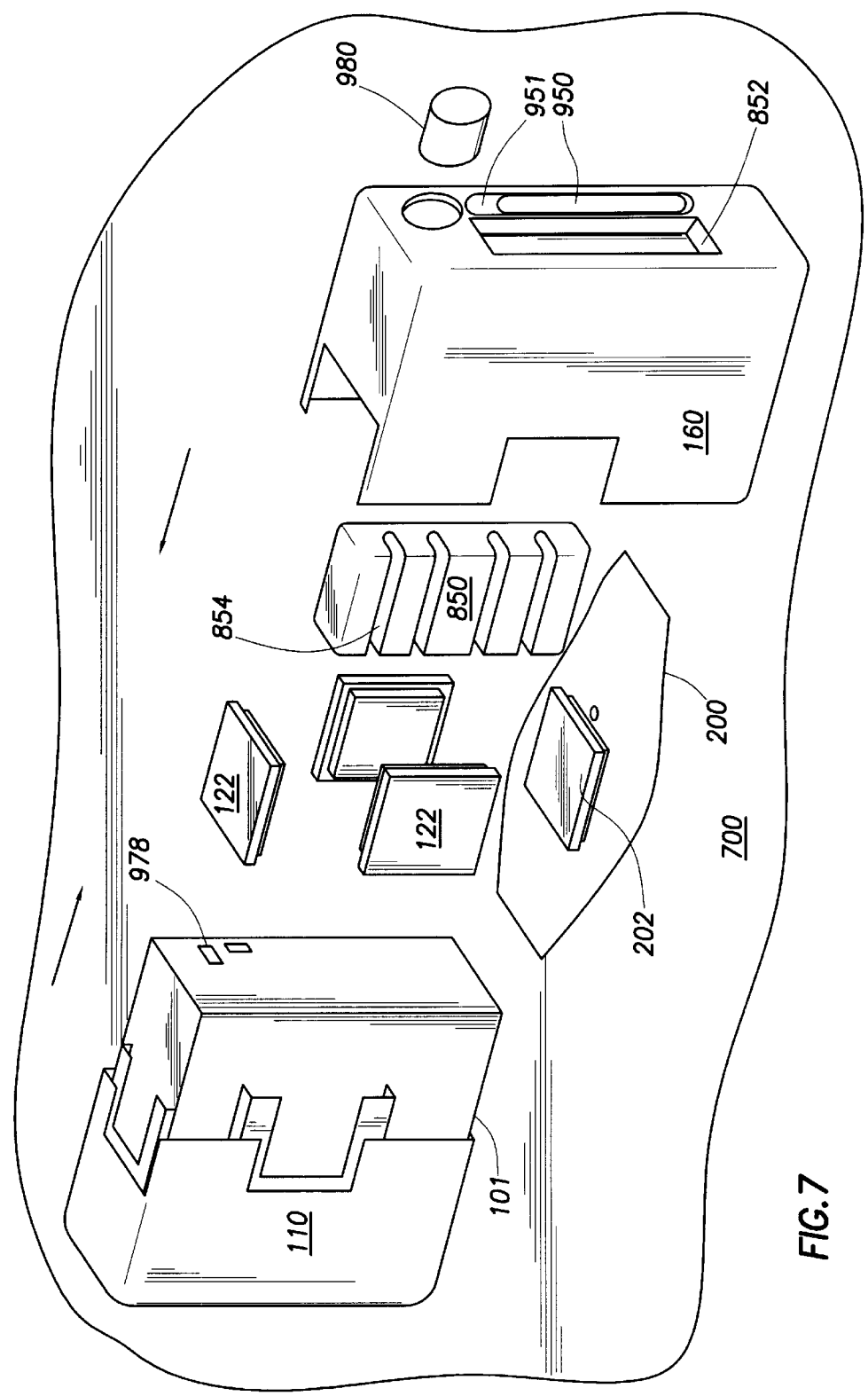
FIG. 7 is an exploded view of a computer assembly according to the present disclosure.
Figure 8A:
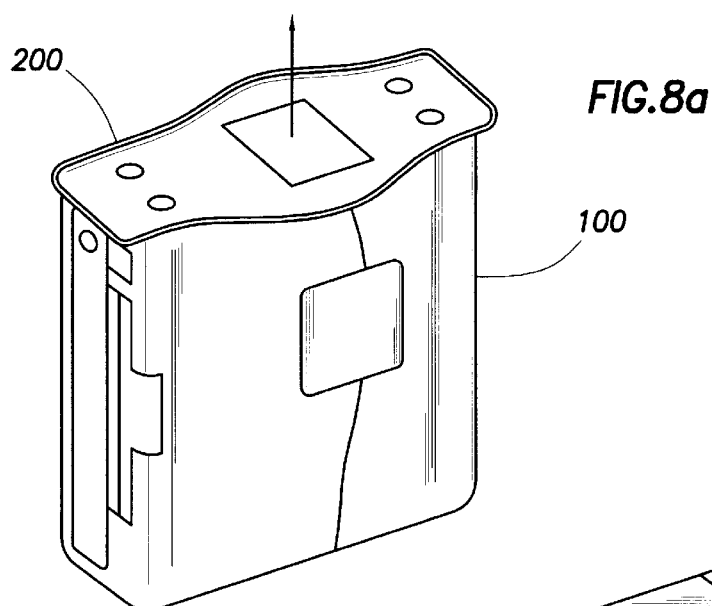
FIG. 8a illustrates a computer assembly according to the present disclosure mountable on a horizontal surface.
Figure 8B:
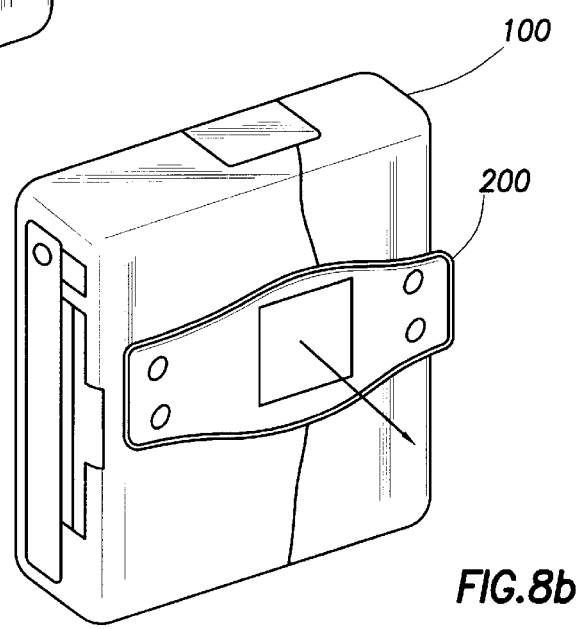
FIG. 8b illustrates a computer assembly according to the present disclosure mountable on a vertical surface.
Figure 8C:
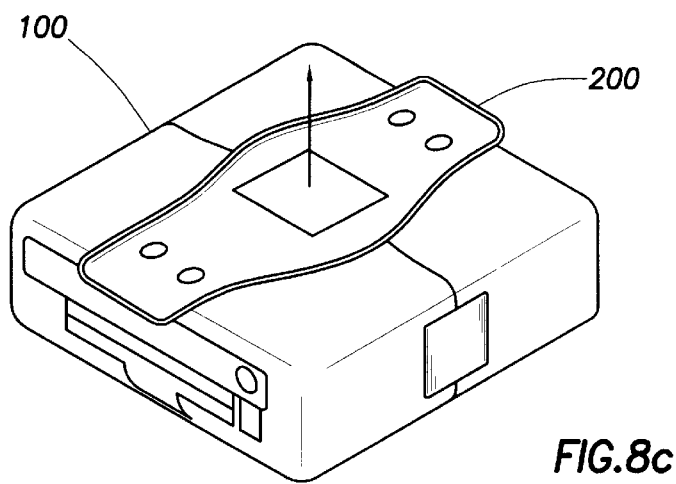
FIG. 8c illustrates a computer assembly according to the present disclosure mountable on a horizontal surface.
Figure 10:
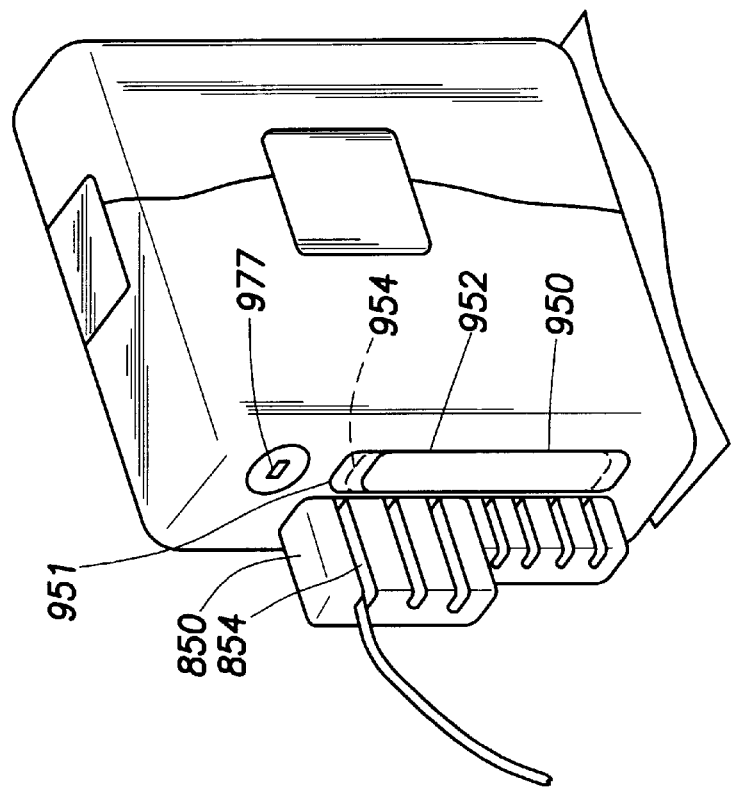
FIG. 10 is a rear perspective view illustrating a computer assembly according to the present disclosure.

The computer assembly may also include a cable positioning element 850 as shown in FIGS. 7 and 10. The cable positioning element is a separate element that surrounds and protects cables that are connected to the back of the chassis. It projects outwardly from the chassis through a cable aperture 852 in the second housing portion and has openings 854 through which the cables may pass. The cable positioning element can only be removed via the interior of the second housing portion. Therefore, when the housing is fully assembled, it cannot be removed and the cables are secure from unauthorized access. This is accomplished by any suitable means, such as by a flared edge or other projection from the cable positioning element that engages the inner surface of the second housing portion or by a projection or the like that engages the chassis itself.

Thus, the computer assembly described above is extremely versatile and secure, and accordingly, is suitable for use in virtually any work environment.

Although the present invention has been described in detail, it should be understood that various changes, substitutions and alterations can be made hereto without departing from the spirit and scope of the invention as defined by the appended claims.

What is claimed is:

1. A computer assembly comprising:
   computer system having at least a central processing unit and memory located within a chassis;
   a housing, said computer system being located within and coupled to said housing, said housing having first and second portions positioned substantially adjacent to one another, and configured so as to define therebetween at least first and second substantially identical ports in at least first and second sides of said housing respectively; and
   a mounting member for mounting said computer assembly to a supporting structure, said mounting member being capable of being removably coupled to said chassis through either of said first and second ports.

2. The computer assembly according to claim 1, further comprising a locking assembly, said locking assembly having an unlocked state in which said second housing portion can be separated from said first housing portion, and a locked state in which said second housing portion cannot be separated from said first housing portion.

3. The computer assembly according to claim 2, wherein said locking assembly further comprises:
   a sliding member positioned substantially adjacent an exterior of said housing and movable between a locking position and an unlocking position; and
   an engaging member positioned within an interior of said housing and coupled to said sliding member through said housing, said engaging member having an engaged position in which it engages said chassis, and a disengaged position in which it does not engage said chassis; wherein moving said sliding member from said locking position to said unlocking position causes said engaging member to move from said engaged position to said disengaged position.

4. The computer assembly according to claim 3, wherein said locking assembly further comprises a bar member positioned within said housing and coupled to said sliding bar, said bar member having a bar member aperture therein that is substantially aligned with a lock aperture in said housing when said sliding member is in said locking position.

5. The computer assembly according to claim 4, said locking assembly further comprising a lock having a projection having a configuration such that it can be inserted through said bar member aperture and said lock aperture, wherein when inserted, said lock projection being rotatably by a lock activator inserted in said lock to a position in which it engages said bar member.

6. The computer assembly according to claim 4, wherein said chassis has a chassis lock aperture therein that is substantially aligned with said lock aperture in said housing, said locking assembly further comprising a lock having a projection having a configuration such that it can be inserted through said bar member aperture, said lock aperture, and said chassis lock aperture, wherein when inserted, said lock projection being rotatably by a lock activator inserted in said lock to a position in which it engages an interior of said chassis.

7. The computer assembly according to claim 6, wherein said lock projection has a substantially T-shaped configuration.

8. The computer housing assembly according to claim 2, wherein said locking assembly further comprises:
   a sliding member positioned substantially adjacent an exterior of said housing and movable between a locking position and an unlocking position;
   an engaging member positioned within an interior of said second housing portion and coupled to said sliding member through said housing, said engaging member having an engaged position in which it engages said first housing portion and a disengaging position in which it does not engage said first housing portion; and
   wherein moving said sliding member from said locking position to said unlocking position causes said engaging member to move from said engaged position to said disengaged position.

9. The computer assembly according to claim 8, wherein said locking assembly further comprises a bar member positioned within said housing and coupled to said sliding bar, said bar member having a bar member aperture therein that is substantially aligned with a lock aperture in said second housing portion when said sliding member is in said locking position.

10. The computer housing assembly according to claim 9, said locking assembly further comprising a lock having a projection having a configuration such that it can be inserted through said bar member aperture and said lock aperture, and wherein when inserted, said lock projection being rotatable by a lock activator inserted in said lock to a position in which it cannot be removed from said bar member and lock apertures.

11. The computer assembly according to claim 1, further comprising a port cover covering said at least one port that has not received said mounting member.

12. The computer assembly according to claim 1, wherein said computer housing is rotatably mounted to a supporting surface by said mounting member.

13. The computer assembly according to claim 1, wherein said mounting member is a foot member, and wherein said foot member is fixedly secured to a supporting surface by a plurality of securing elements, and wherein at least one of said plurality of securing elements is positioned so as to be substantially inaccessible when said foot member is coupled to said chassis.

14. The computer assembly according to claim 1, wherein said mounting member is a modular mounting member capable of securing said computer assembly to a chassis of a second computer assembly through a port in a housing of said second computer assembly.

15. The computer assembly according to claim 1, wherein said mounting member is a stand member for supporting selected objects.

16. The computer assembly according to claim 1, wherein said mounting member is a computer component coupling element for coupling said computer assembly to a selected computer component.

17. The computer assembly according to claim 1, wherein said computer system has a media bay therein for receiving a peripheral device, and a media bay ejector for ejecting said peripheral device from said media bay, and said housing has a media bay aperture therein substantially aligned with said media bay, and a housing media bay ejector capable of activating said computer system media bay ejector.

18. The computer assembly according to claim 17, wherein said computer system further includes a media bay ejector lock for deactivating said media bay ejector, said media bay ejector lock being inaccessible when said computer system is positioned within said housing.

19. The computer assembly according to claim 1, wherein said housing has a cable aperture therein, and said computer assembly further comprises a cable holder having at least one opening therein for guiding cables connected to an exterior of said chassis to an exterior of said housing through said at least one opening, said cable holder projecting outwardly from said housing through said cable aperture and being engaged to said computer assembly.

20. The computer assembly according to claim 19, wherein said cable holder is engaged with said chassis.

21. The computer assembly according to claim 19, wherein said cable holder has an inner projection that engages an interior of said housing.

22. The computer assembly according to claim 1, wherein said chassis further comprises at least first and second substantially identical receiving members positioned substantially adjacent to said at least first and second ports respectively, and wherein said mounting member is capable of being removably coupled to either of said first or second receiving members.

23. The computer assembly according to claim 22, wherein said chassis receiving members further comprise first and second substantially hook shaped projections projecting outwardly from said chassis and towards one another.

24. The computer assembly according to claim 23, wherein said mounting member engages said first and second substantially hook shaped projections.

25. The computer assembly according to claim 22, wherein said housing further includes third and fourth ports therein in third and fourth sides respectively, and wherein said mounting member is capable of being removably coupled to said chassis through either of said third and fourth ports.

26. The computer assembly according to claim 25, wherein said chassis further comprises third and fourth receiving members positioned substantially adjacent to said third and fourth ports respectively, and wherein said mounting member is capable of being removably coupled to said chassis through either of said third and fourth receiving members.

27. A computer housing assembly comprising:
a housing having a first housing portion and a second housing portion positioned substantially adjacent one another so as to define therebetween at least first and second ports in first and second sides of said housing respectively, said housing being capable of substantially surrounding a computer chassis; and
a mounting member coupled to said computer housing assembly through a selected one of said first and second ports, said mounting member being capable of being coupled to said computer housing assembly through either of said first and second ports.

28. A computer housing assembly comprising:
a housing having a first housing portion and a second housing portion substantially adjacent to one another so as to define therebetween at least first and second ports in first and second sides of said housing respectively, said housing being capable of substantially surrounding a computer chassis; and
a mounting member having a coupling element capable of being received through either of said first and second ports for mounting said computer housing assembly to a supporting surface.

29. The computer housing assembly according to claim 28, wherein said first housing portion and second housing portions and said mounting member are capable of being coupled to said chassis.

30. The computer housing assembly according to claim 28, wherein said first and second housing portions are coupled to one another.

31. The computer housing assembly according to claim 28, wherein said coupling element of said mounting member is capable of being coupled to said chassis.

32. The computer housing assembly according to claim 28, wherein said coupling element of said mounting member is coupled to said housing.

33. The computer housing assembly according to claim 28, further comprising a port cover for covering the at least one port that has not received said mounting member.

34. The computer housing assembly according to claim 28, further comprising a locking assembly, said locking assembly having an unlocked state in which said first and second housing portions can be separated from one another, and a locked state in which said first and second housing portions cannot be separated from one another.

35. The computer housing assembly according to claim 34, wherein said locking assembly further comprises:
a sliding member substantially adjacent an exterior of said housing and movable between a locking position and an unlocking position; and
an engaging member positioned within an interior of said housing and coupled to said sliding member through said housing, said engaging member having an engaged position in which it engages said chassis and a disengaging position in which it does not engage said chassis,
wherein moving said sliding member from said locking position to said unlocking position causes said engaging member to move from said engaged position to said disengaged position.

36. The computer housing assembly according to claim 35, wherein said locking assembly further comprises a bar member positioned within said housing and coupled to said sliding bar, said bar member having a bar member aperture therein that is substantially aligned with a lock aperture in said housing when said sliding member is in said locking position.

37. The computer housing assembly according to claim 36, said locking assembly further comprising a lock having a projection having a configuration such that it can be inserted through said bar member aperture and said lock aperture, and wherein when inserted, said lock projection is rotatably to a position in which it cannot be removed from said bar member and lock apertures.

38. The computer assembly according to claim 37, wherein said chassis has a chassis lock aperture therein that is substantially aligned with said bar member aperture, said lock projection being insertable through said chassis lock aperture.

39. The computer housing assembly according to claim 34, wherein said locking assembly further comprises
- a sliding member positioned substantially adjacent an exterior of said housing and movable between a locking position and an unlocking position; and
- an engaging member positioned within an interior of said second housing portion and coupled to said sliding member through said housing, said engaging member having an engaged position in which it engages said first housing portion and a disengaging position in which it does not engage said first housing portion,
- wherein moving said sliding member from said locking position to said unlocking position causes said engaging member to move from said engaged position to said disengaged position.

40. The computer housing assembly according to claim 39, wherein said locking assembly further comprises a bar member positioned within said housing and coupled to said sliding bar, said bar member having a bar member aperture therein that is substantially aligned with a lock aperture in said second housing portion when said sliding member is in said locking position.

41. The computer housing assembly according to claim 40, said locking assembly further comprising a lock having a projection having a configuration such that it can be inserted through said bar member aperture and said lock aperture, and wherein when inserted, is rotatable to a position in which it cannot be removed from said bar member and lock apertures.

42. The computer housing assembly according to claim 41, wherein said mounting member is fixedly secured to a supporting surface by a plurality of securing elements, and wherein at least one of said plurality of securing elements is substantially inaccessible when said first and second housing portions are not separated from one another.

43. The computer housing assembly according to claim 28, wherein said housing has a cable aperture therein, and said computer housing assembly further comprises a cable holder having at least one opening therein for guiding cables connected to an exterior of the chassis to an exterior of the housing through said cable aperture and said at least one opening, said cable holder being secured within said housing and projecting outwardly from said housing through said cable aperture.

44. The computer housing assembly according to claim 28, said first and second housing portions further defining therebetween at third and fourth ports in third and fourth sides of said housing, said third and fourth ports being of substantially identical configuration to said first and second ports, and said coupling element being capable of being received through either of said third and fourth ports for mounting said computer housing assembly to said supporting surface.

45. A method for housing a computer system comprising the steps of:
- mounting a mounting member to a support surface;
- coupling a chassis of said computer system to a first housing portion of a computer housing so that said computer system is partially positioned within said first housing portion;
- coupling said mounting member to said chassis;
- positioning a second housing portion of said computer housing substantially adjacent said first housing portion so that said first and second housing portions substantially surround said chassis, so that said first and second housing portions define therebetween at least first and second substantially identical ports in first and second sides of said computer housing respectively, and so that said mounting member extends through a selected one of said first and second ports; and
- coupling said second housing member to said chassis.

46. The method according to claim 45, wherein said second housing coupling step further comprises the step of engaging an engaging element of said second housing portion with said chassis, said engaging element being movable between an engaged position in which said engaging element engages said chassis and a disengaged position in which said engaging element does not engage said chassis.

47. The method according to claim 46, further comprising the step of preventing said engaging element from disengaging said chassis.

48. The method according to claim 47, wherein said engaging element is mechanically coupled to a bar element positioned within said second housing portion, and wherein said preventing step further comprises the step of inserting a lock element through a lock aperture in said housing and a bar aperture in said bar to prevent movement of said bar element relative to said housing and thereby prevent movement of said engaging element to said disengaging position.

49. The method according to claim 48, further comprising the step of moving said lock element relative to said apertures so that it cannot be removed from said apertures.

50. The method according to claim 45, further comprising the steps of, prior to said positioning step, positioning a cable holder having at least one opening therein so that it extends outwardly from said second housing portion through a cable aperture in said second housing portion; and extending out through said at least one opening at least one cable that is coupled to said computer system.

* * * * *